United States Patent

[11] 3,542,495

| [72] | Inventor | Maurice Barthalon<br>78 Avenue Henri Martin, Paris, France |
|---|---|---|
| [21] | Appl. No. | 801,127 |
| [22] | Filed | Feb. 20, 1969<br>Continuation-in-part of Ser. No. 767,888,<br>Aug. 30, 1968, now Patent No. 3,461,806,<br>which is a continuation-in-part of Ser. No.<br>581,060, Sept. 21, 1966, abandoned. |
| [45] | Patented | Nov. 24, 1970 |
| [32] | Priority | Sept. 24, 1965, Feb. 23, 1968 |
| [33] | | France |
| [31] | | Nos. 32529 and 141037 |

[54] RECIPROCATING ELECTRIC MOTOR
24 Claims, 23 Drawing Figs.

[52] U.S. Cl. ........................................ 417/416;
310/24; 318/119
[51] Int. Cl. ........................................ F04b 17/04;
H02k 33/00
[50] Field of Search ........................................ 103/53,
53A; 230/55; 310/18, 24, 30; 318/119; 417/416

[56] References Cited
UNITED STATES PATENTS

| 2,721,024 | 10/1955 | Zeh | 230/55 |
| 2,839,237 | 6/1958 | Dolz | 230/55 |
| 3,134,938 | 5/1964 | Morgan | 310/30X |
| 3,196,797 | 7/1965 | Marini | 310/18X |
| 3,221,798 | 12/1965 | Kofink | 103/53 |
| 3,461,806 | 8/1969 | Barthalon | 103/53 |

*Primary Examiner*—Robert M. Walker
*Attorney*—Brumbaugh, Graves, Donohue & Raymond ABSTRACT: A reciprocating machine having an electric motor and a device such as a pump or compressor driven by the motor. The motor has an electromagnetic circuit with a pair of spaced-apart poles defining an air gap and at least one field coil adapted to generate a magnetic field across the air gap, and a magnetic armature mounted for reciprocating movement along an axis disposed transversely to the magnetic field and coupled to the driven device. The motor field coil is supplied with a succession of unidirectional electric current pulses, the power supply including current control elements that prevent the current from reversing direction in the field generating coil at the end of each current pulse and that initiate each pulse only when the supply voltage is of proper polarity. Upon each current pulse, the armature is pulled into the air gap by the forces exerted on it by the electromagnetic field. The armature is driven in a direction to move it entirely out of the air gap by forces created by a return means distinct from the force on the armature produced by the magnetic field. Other features include means to provide for high initial current flow through the field coil, and an arrangement of elastic means acting on the armature to provide for greater overall efficiency and a favorable power to weight ratio.

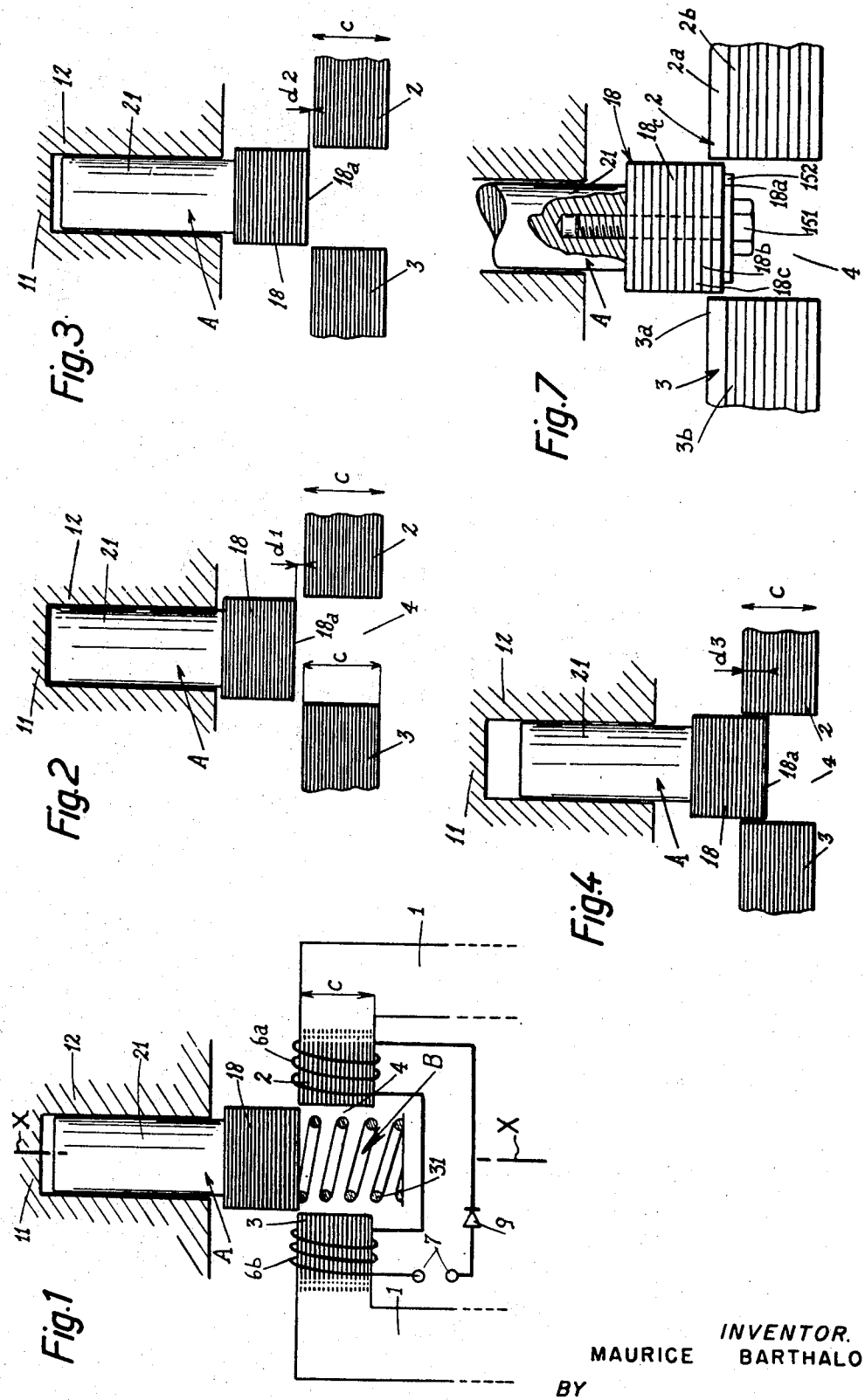

Patented Nov. 24, 1970

INVENTOR.
MAURICE BARTHALON

BY
Brumbaugh, Graves, Donohue + Raymond
his ATTORNEYS

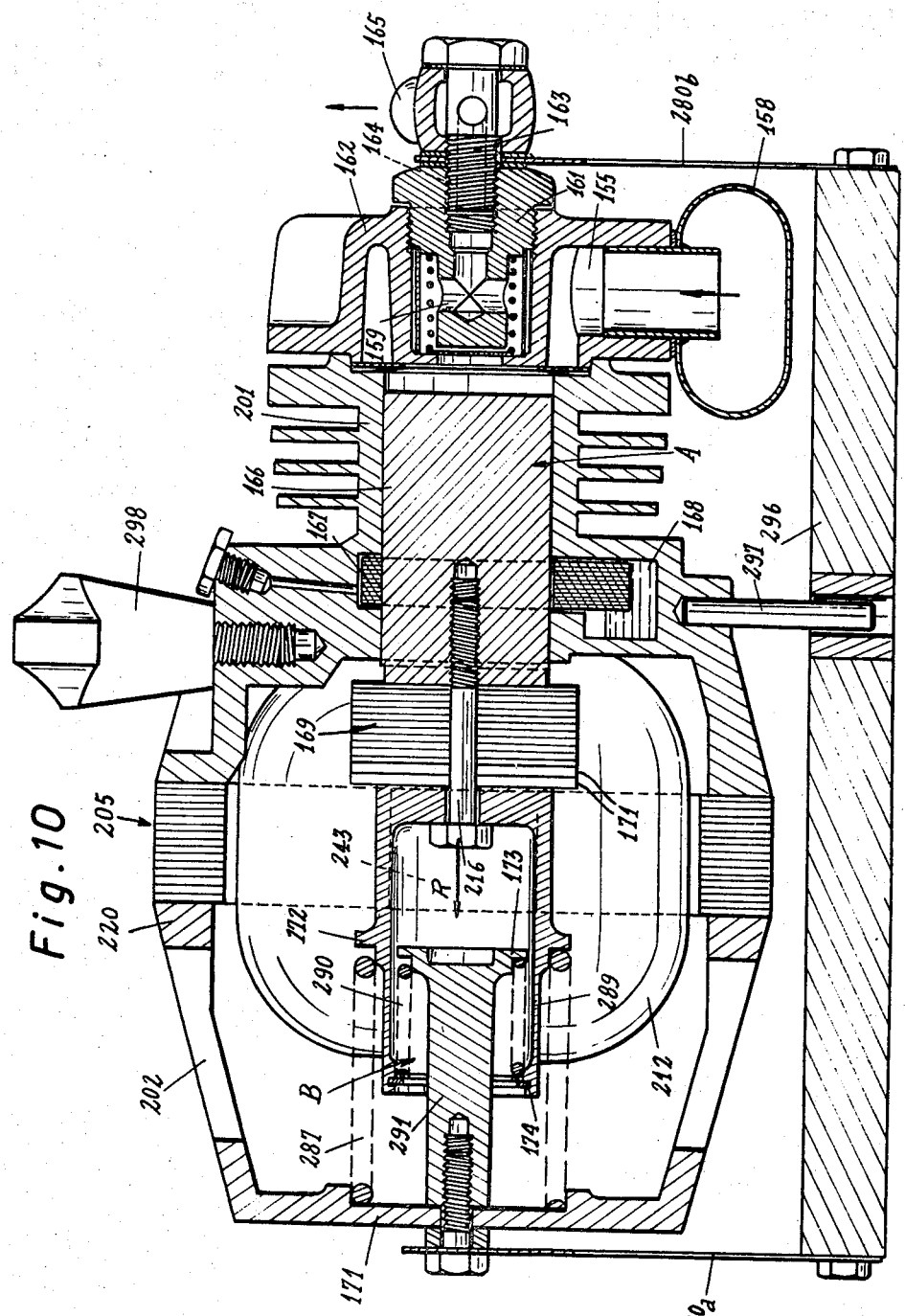

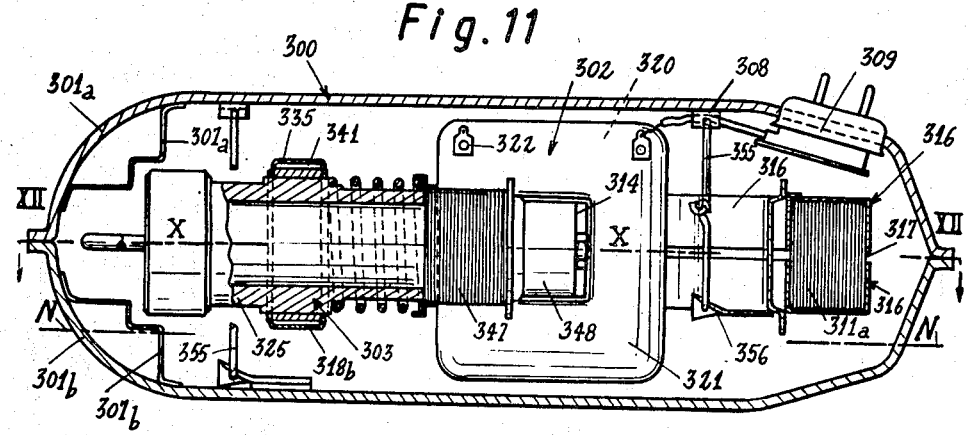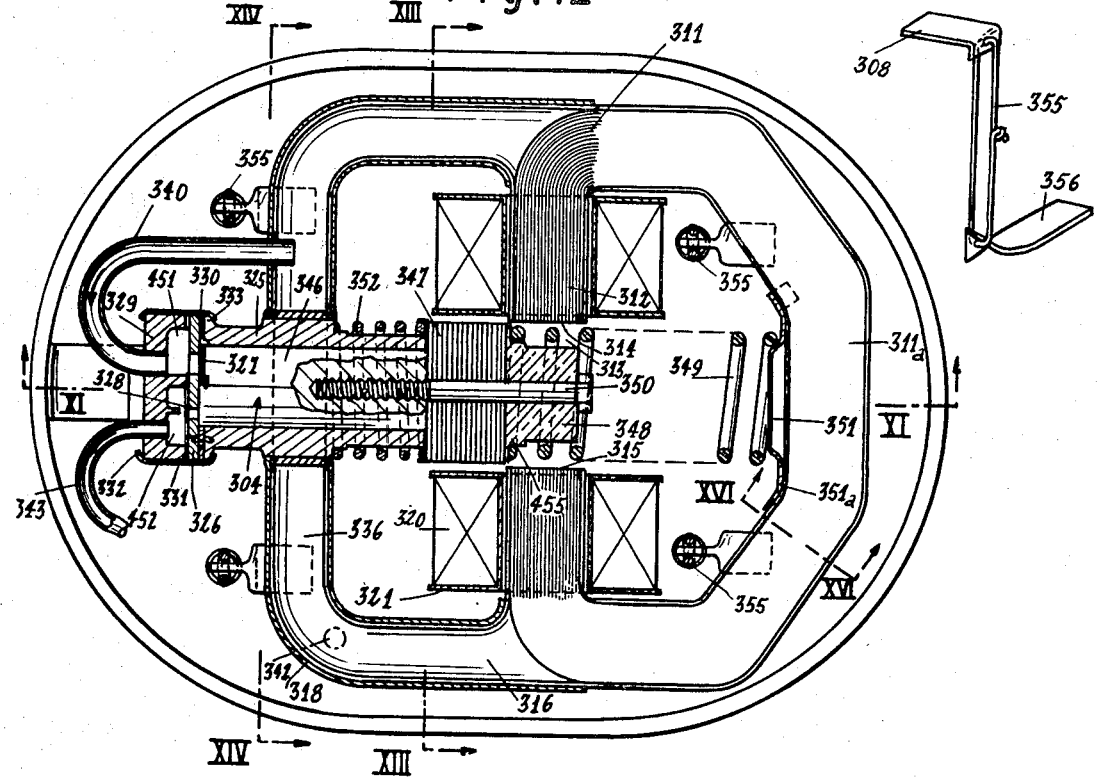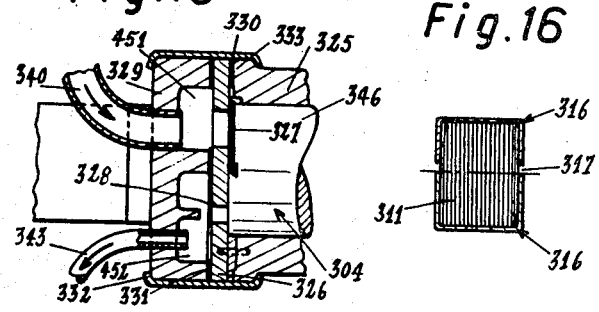

INVENTOR.
MAURICE BARTHALON

BY

Brumbaugh, Graves, Donohue & Raymond
his ATTORNEYS

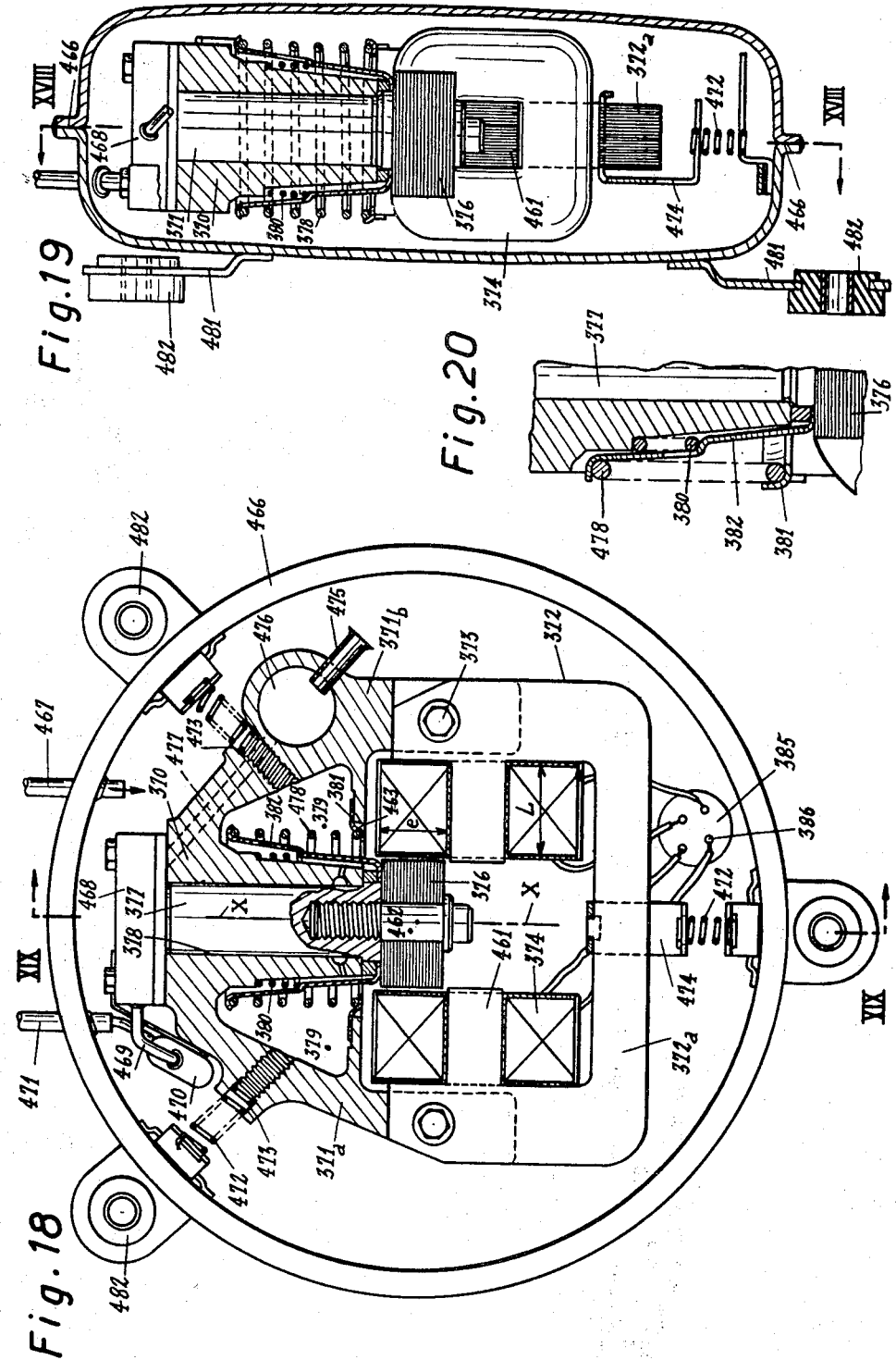

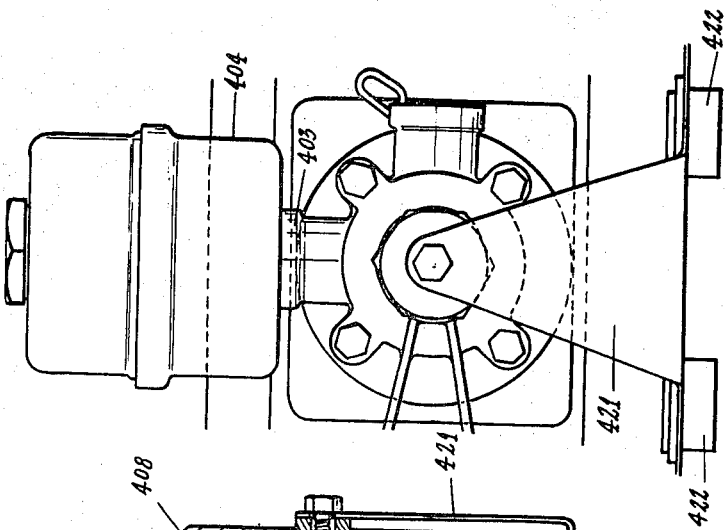
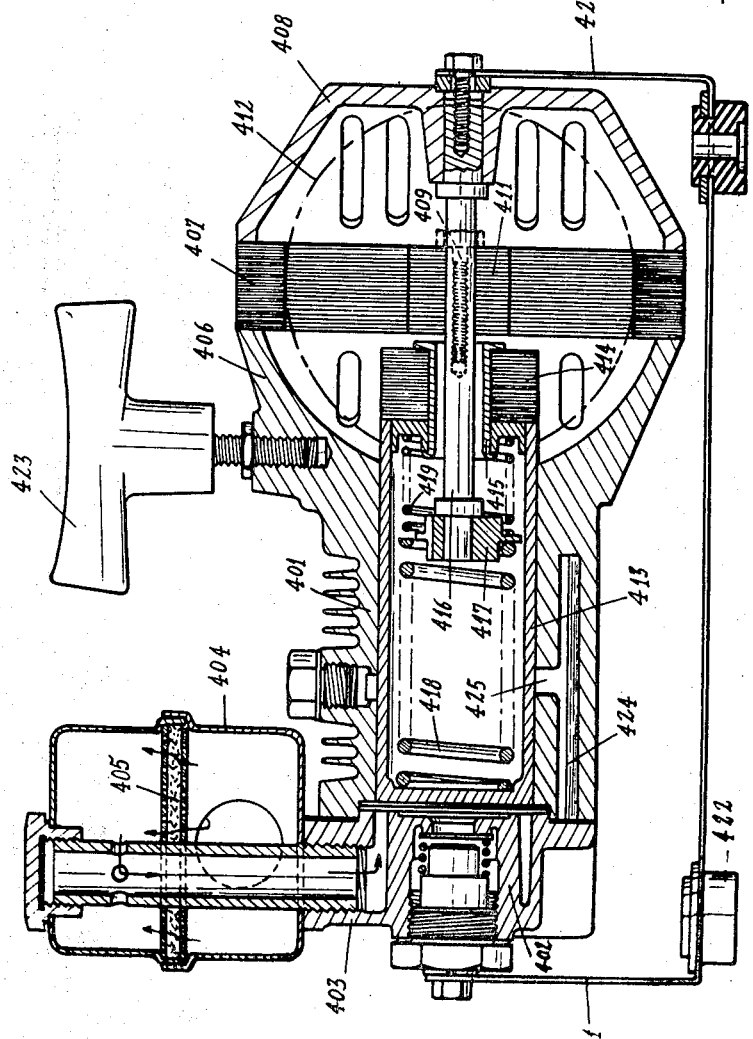
INVENTOR
MAURICE BARTHALON

3,542,495

RECIPROCATING ELECTRIC MOTOR

This application is a continuation-in-part of copending application Ser. No. 767,888 filed Aug. 30, 1968, now U.S. Pat No. 3,461,806 and application Ser. No. 581,060 filed Sept. 21, 1966, now abandoned.

BACKGROUND OF THE INVENTION

This invention relates to reciprocating electric motors of the type which include a fixed electromagnetic circuit with spaced-apart poles provided with an electrical winding and a magnetic armature movable in the field created by the fixed magnetic circuit.

A motor of the type with which the invention is concerned can be used to drive reciprocating pumps and compressors using pistons, such as refrigeration compressors and heat pumps, air and gas compressors of medium and high pressure, and medium and high pressure pumps, especially variable delivery pumps, such as those used in control equipment of various types. It may also be used in various vibratory machines such as mechanical sieves, vibratory conveyors, rams, electric hammers, riveters, fatigue testing machines for industry, vibratory test benches, industrial portable tools such as reciprocating saws, and sanders and for domestic equipment such as beaters, electric carving knives, razors, vibrators, sewing machines, and the like.

The electric motor disposed in application Ser. No. 767,888 includes structure that provides lines of force of a magnetic field in an air gap separating a pair of poles, the lines of force being directed transversely with respect to the axis of movement of the driving armature. The electrical winding generating the field is connected to a source of electric supply delivering a succession of unidirectional impulses, and the supply circuit comprises a device such as a rectifier to prevent reversal of the direction of the electric current in the winding. In that motor the magnetic driving armature is subjected to the action of a return means independent of the magnetic circuit, such that the magnetic circuit ensures the movement of the armature during the power stroke while its movement during the other stroke is provided by the return means which is independent of the circuit.

In an electric motor of this type, it has been discovered that the overall efficiency, as well as the unit power, varies rapidly as a function of the movement of the moving assembly, and more especially as a function of (1) the position of the dead points at the two ends of the stroke of the assembly, (2) the phase angle between the displacement of the assembly and the intensity of the current, and (3) the law of variation of current relative to the displacement of the moving assembly.

Each time that the operation conditions of the driven part (for example the suction pressure or the delivery pressure of a compressor or a pump) vary, the movement of the moving assembly is modified such that the power absorbed by the driven member remains equal to the power delivered by the driving armature. This modification of the assembly movement results in a variation of the power developed by the electric motor. Once more there results a modification of the movement, and so on. There is thus a tendency towards a new steady state of operation so that the sensitivity of the electric part of the motor to any modification of the assembly movement has a major influence on the efficiency and power to weight ratio, both of the electric motor and of the driven unit. In particular, if the latter is a pump or a compressor, the variation of the top dead point can produce a reduction or an appreciable increase of flow.

SUMMARY OF THE INVENTION

In the following description, the "mechanical top dead point" means the position of the moving assembly when it reaches its mechanical limit. In a pump or a compressor this corresponds substantially with contact between the piston and the cylinder head. In order that the power to weight ratio may be a maximum, the mechanical top dead point should be as close as possible to the "top dead point of operation." The opposite extreme position will be called the "bottom dead point of operation." Further, the "zero force position" refers to the static position of the moving assembly corresponding to equilibrium of the elastic forces acting on it when it is stationary.

An object of the present invention is to obtain an appreciable improvement in the overall efficiency and of the power to weight ratio of a reciprocating electric motor.

Another object of the invention is to reduce variations of the top dead point of operation as a function of the starting and operating conditions of the motor, i.e., delivery pressure, suction pressure, the voltage across the terminals, etc.

A further object of the present invention is to provide simple motor structures which lend themselves especially well to mass production at low cost.

Yet another object of this invention is to provide solutions to practical operating problems, such as starting of the reciprocating motor.

In particular, a reciprocating electric motor according to the present invention is dimensioned such that in its mechanical end of stroke position, the magnetic armature is entirely outside the air gap. Preferably the distance separating the entrance of the air gap from the adjacent end face of the armature is substantially between 2 and 20 percent of the axial length of the air gap.

Another feature of the present invention concerns the mechanical conditions of operation of the electric motor. More particularly, for the normal mechanical load of the moving assembly of the motor, its natural resonant frequency under the influence of forces other than those exerted by the magnetic circuit on the armature, that is to say the elastic, pneumatic, hydraulic forces, etc., acting on the moving assembly, remains close to the frequency of the electric impulses.

The moving assembly of the motor is associated with an elastic system of appreciable stiffness. Preferably this system is such that at the top dead point of operation it exerts a force on the moving assembly which does not exceed 10 percent of that exerted at the bottom dead point of operation. This elastic system may comprise a single spring fulfilling this condition or may comprise two opposing springs acting only as necessary for a part of the stroke of the moving assembly, that is, a main return spring returning the magnetic armature out of the air gap and an auxiliary spring tending to move the armature back towards the air gap.

Preferably the magnetic armature is mounted so that it overlaps in one position the extremities of a preferably smooth piston of appreciable length in one of its positions, the piston sliding in a cylinder and forming part of the moving assembly.

BRIEF DESCRIPTION OF THE DRAWINGS

Other features and advantages of the present invention will be understood when the following description of exemplary embodiments is read in conjunction with the FIGS. of the accompanying drawings, in which:

FIG. 1 is a side view in section, shown diagrammatically, of an embodiment of the invention;

FIGS. 2 to 4 are views similar to FIG. 1 showing other operating positions of the embodiment;

FIG. 7 is a partial side view in section of another embodiment of the invention;

FIG. 10 is an axial section of another embodiment of the invention taken along a plane perpendicular to that of FIG. 8;

FIG. 11 is a vertical section of another embodiment taken along the view line XI—XI of FIG. 12, the return spring for the moving assembly not being shown;

FIG. 12 is a plan section taken on the plane XII—XII of FIG. 11;

FIG. 15 is a section similar to FIG. 12 showing the cylinder head on a larger scale;

FIG. 16 is a section along the line XVI—XVI of FIG. 12;

FIG. 17 is a perspective diagram illustrating the suspension of the body of the electrocompressor shown in FIGS. 11 through 16;

FIG. 18 is a horizontal section of a further embodiment taken along the view line XVIII—XVIII of FIG. 19;

FIG. 19 is a transverse section along the line XIX—XIX of FIG. 18;

FIG. 20 shows a part of the spring arrangement of the electrocompressor of FIGS. 18 and 19 on a larger scale;

FIG. 22 is a vertical axial section of another electrical compressor in accordance with the present invention; and FIG. 23 is an end elevation of the compressor shown in FIG. 22.

DESCRIPTION OF EXEMPLARY EMBODIMENTS

Figure 6:
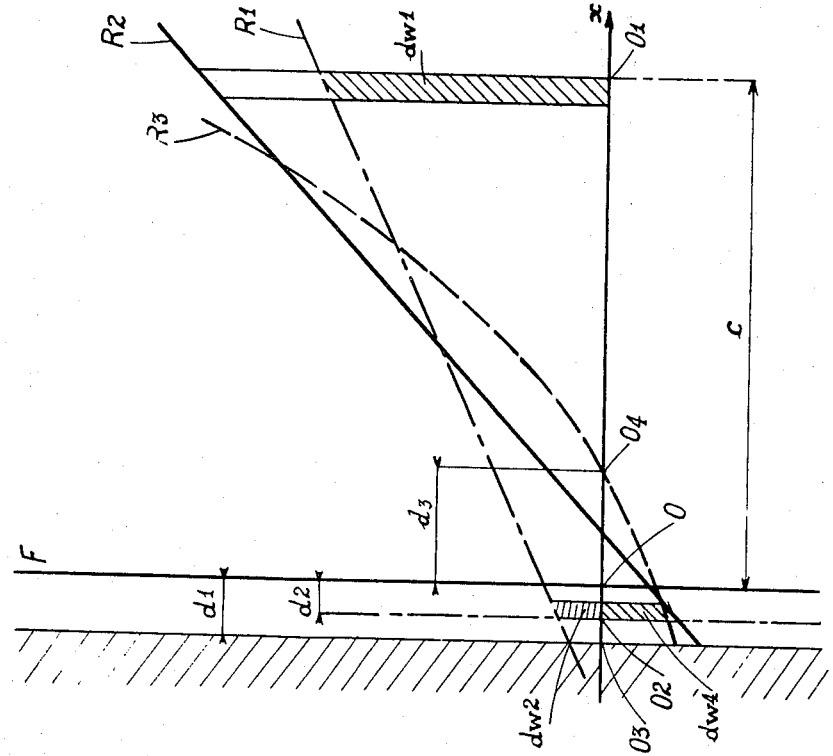
FIGS. 5 and 6 are diagrams used in explaining operation of the inventive motor.

The embodiments of the invention shown in the drawings and described hereinafter are exemplary of the use of the electric motor of the invention to power a pump or compressor. In each embodiment, the pump or compressor unit forms an integral part of the motor structure by, for example, serving as a guide or mounting for the motor armature. The electric motor of the invention is particularly well suited for pumps and compressors, but it will be understood by those skilled in the art that the motor, per se, has utility in a variety of other devices, as previously referred to.

Referring to FIGS. 1 to 4, a magnetic circuit 1 includes pole pieces 2 and 3 carrying electrical windings or coils 6A and 6B fed from a supply of alternating current, preferably having a sinusoidal wave form, across a rectifier element 9 which allows only every alternate half wave to pass. Between the pole pieces 2 and 3 is an air gap 4 of length C measured in the direction of the longitudinal axis X—X of the machine. The magnetic circuit 1 is mechanically joined (not shown) to the rest of the stator formed, for example, by a cylinder 12 closed by a cylinder head 11.

The electric motor also comprises a moving assembly A, moving on axis X—X, and formed by the combination of a magnetic armature 18 and an operating slide formed by a piston 21 sliding in the bore of the cylinder 12. The moving assembly A thus formed is subjected to the action of an elastic system B comprising at least one spring 31 which ensures the return movement of the moving assembly A.

When the moving assembly A reaches the mechanical top dead point, which is the mechanical limit position in FIG. 2, the magnetic armature 18 is situated entirely outside the air gap 4. In this position, the distance $d_1$ separating the adjacent end face 18a of the magnetic armature 18 and the entrance to the air gap 4, is substantially between 2 and 20 percent of the axial length C.

The distance $d_2$ (FIG. 3) separating the adjacent end face 18a of the armature 18 and the entrance to the air gap 4, when the moving assembly is at its top dead point of operation, is less than the distance $d_1$ but it is as close to it as possible and is in the same sense. In other words, in this position of the moving assembly, the end face 18a of the armature is situated outside of the air gap 4.

Referring to FIG. 4, when the moving assembly A is in the zero force position, as defined earlier, the armature 18 is partially in the air gap 4 and the distance $d_3$ separating the end face of the armature and the entrance to the air gap 4, measured in the opposite direction to the preceding measurements, is substantially between 2 and 20 percent of the axial length C of the air gap.

It has been found that reciprocating electrocompressors constructed in accordance with the foregoing provide unexpectedly favorable results in that the efficiency, power to weight ratio and stability of the motors are greatly enhanced. The other arrangements which will be described lead to the same results.

Figure 5:
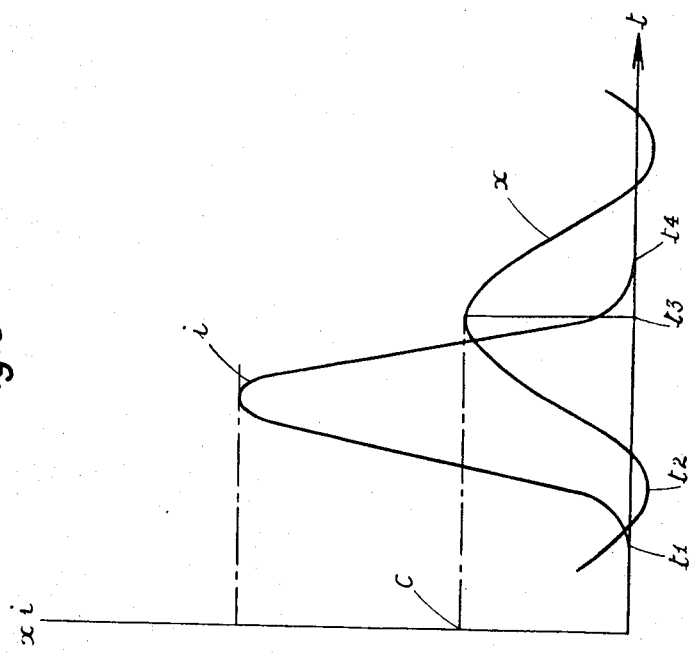

Referring now to FIG. 5, if the ordinate $x$ is the distance between the end face 18a of the armature 18 and the entrance to the air gap 4, this distance being positive if the armature 18 penetrates into the air gap and negative if it is outside, and if $t$ is the time and $i$ the excitation current of the coils 6a and 6b, the electric motor and its supply are regulated so that the impulse of current $i$ commences at moment $t_1$ before the armature 18 has reached its top dead point of operation (position of FIG. 3) at the moment $t_2$, and that this impulse ends at the moment $t_4$ which is very close to the moment $t_3$ when the armature 18 is at the bottom dead point of operation (for which $x=C$).

The electric motor may be considered as a machine whose moving assembly A is subjected to forces other than those exerted by the magnetic circuit, for example mechanical, hydraulic or pneumatic forces (depending on the load). Under these conditions, the electric motor is set up and adjusted such that for the rated load specified (for example, rated delivery pressure) the natural frequency of resonance of the dynamic system comprising the moving assembly subjected to all the forces mentioned above, is close to the frequency of the electric impulses.

In accordance with the present invention, the elastic system B is constructed to cooperate with the moving assembly in a manner that provides increased operating efficiency. In particular, referring to FIG. 6, in which F refers to the value of the positive or negative elastic forces acting on the assembly A and $x$ to the value of the distance from the end face of the armature 18 to the entrance O of the air gap 4, $O_1$ is the bottom dead point of operation, $O_2$ the top dead point of operation of FIG. 3, and $O_3$ the mechanical top dead point or limit position of FIG. 2.

The system B shown diagrammatically as the spring 31 (FIG. 1) comprises at least one spring whose stiffness curve $R_1$ is steep. Under these conditions the variation of return energy $dw_1$ accumulated in the region of the bottom dead point for a variation of stroke $dx$ is appreciably greater than the corresponding variation $dw_2$ in the region of the top dead point of operation. Thus the electric motor has little accumulated energy at the top dead point. On the other hand, a small increase in stroke at the bottom dead point of operation permits the storage of appreciable return energy of the moving assembly.

Preferably the force which the spring system B exerts when expanded beyond O, does not exceed 10 percent of the maximum force which it exerts when the moving assembly A is at the other extremity of the stroke. At the bottom dead point the return energy thus varies very rapidly with the stroke. Any increase in the stroke, in particular due to an improvement in the tuning of the electrical and mechanical phases or to an increase in the delivery pressure produces an appreciable increase in the return energy. This results in a tendency for the top dead point of operation to move towards the cylinder head. This compensates the tendency of the top dead point of operation to return towards the entrance of the air gap due to the increase in the delivery pressure. It is thus possible to precisely control the top dead point of operation and, in particular, to render it insensitive to the delivery pressure of the pump.

According to another improvement, it is intended to increase the slope of the spring system B (curve $R_2$) by using an auxiliary return spring, acting against a main return spring and at the top dead point of operation exerting a force in the same direction as the electromagnetic force. A similar result may also be obtained by using for the spring system B a spring 31 of variable stiffness (curve $R_3$) which may work in compression and, beyond point $O_4$ of zero force, where, as stated above, the armature 18 is a distance $d_3$ within the air gap, in extension. It follows that, when stationary, the armature 18 is in position $O_4$, which facilitates starting at no load or under load. Simultaneously, during the two first strokes an excess of driving power is avoided, which would otherwise result in risks of a mechanical shock at the top dead point of operation.

Referring next to FIG. 7, the specific reluctance of the elements forming the magnetic circuit are constructed to decrease as the armature enters the air gap 4. This result may be obtained by making parts 2, 3 and 18 from dissimilar magnetic materials, that is, having different permeabilities which increase as the armature enters the air gap. For example, the armature 18 may have a first element 18a of cast iron, a second 18b of silicon iron and following elements 18c of grain-orientated magnetic sheet, the grain being arranged in the direction of flow of the magnetic flux, that is parallel to the axis of the pole pieces 2 and 3. The same arrangements may be used for the pole pieces.

Moreover, the first elements 18a, 2a, 3a of the magnetic circuits may all be of greater thickness, for example, double that of the following elements, which avoids distortion in bending of these elements under the effect of the magnetic forces.

The combination of these magnetic characteristics with the positioning of the armature 18 entirely out of the air gap 4, when moving assembly A is in the top dead point of operation, results in various advantages, notably the following: the electric supply impulse produces a relatively small force at the beginning of the stroke because of the small variation of reluctance. The moving assembly A thus has low acceleration resulting in a rapid rise in current which is thus high when the assembly picks up speed; hence a high efficiency of electromechanical transfer and a high power to weight ratio is provided. On the other hand, the initial flux traversing the armature is reduced owing to its being distant from the magnetic circuit and to the low permeability of the first layers, while the final flux is increased by the high permeability. This increases the total flux variation during the magnetomotive stroke; thus the magnetomotive work and the power to weight ratio of the machine are increased. Finally the power factor is improved by the improvement of the wave form of the current and the better utilization of the induction circuit. As a result, the quantity of copper required is reduced. The partial use of laminations having poor magnetic characteristics also reduces the price of the electromagnetic part of the machine.

The operating slide 21 is preferably in the form of a piston when used for pumps or compressors, such piston being formed of a smooth single piece of appreciable length assembled without piston rings in the cylinder 12 with small clearance. Preferably its length is greater than 2.5 times its diameter and the clearance between the operating slide 21 and the cylinder 12 is between 5 and 35 microns.

Furthermore, the piston slide 21 preferably forms a direct support for the adjacent magnetic armature 18, which is in contiguous relationship with it, and to which it is attached, for example by means of a bolt 151 of nonmagnetic material, with an interposed thrust washer 152, the bolt 151 being screwed into the cylindrical part 21. Thus guiding of the armature 18, which presents difficult problems for electric motors of the type considered, if friction resulting from magnetic attraction is to be avoided, is achieved under the best conditions.

Preferably the armature 18 and the pole surfaces of the pole pieces 2 and 3 are sections of cylinders and their diameters are greater than the axial length C of the air gap and greater than the diameter of the piston slide 21.

Figure 8:
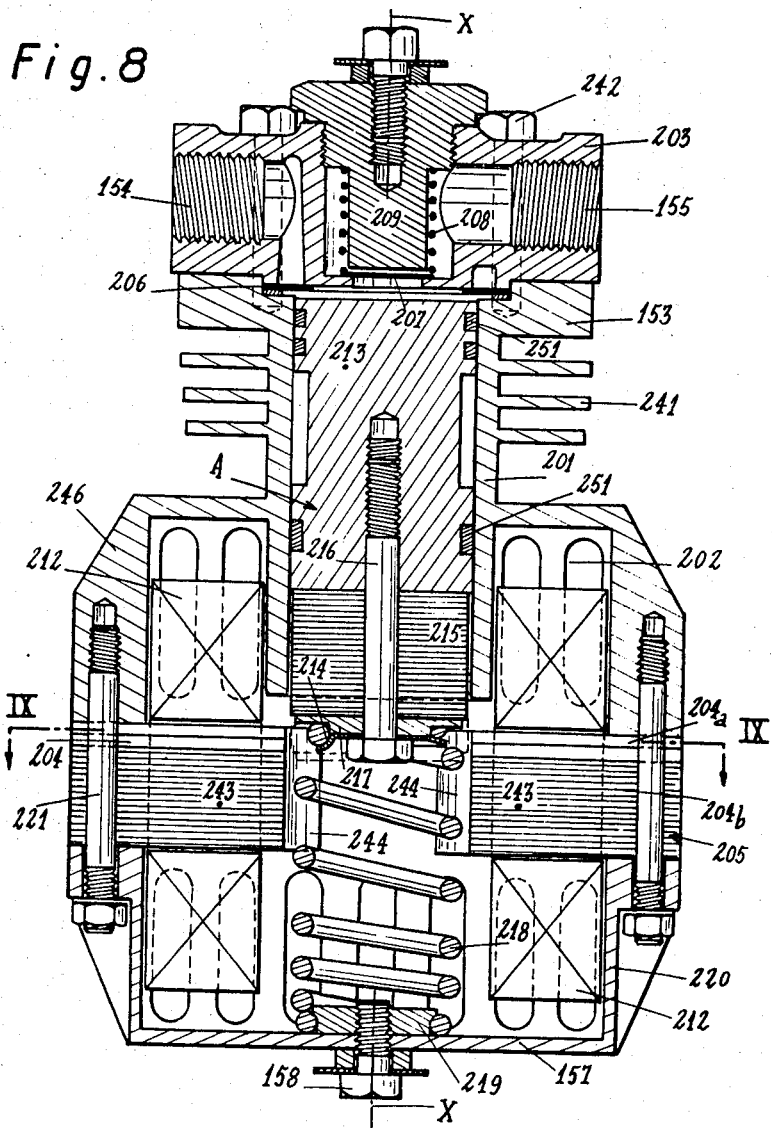
FIG. 8 is an axial section of an embodiment of the invention taken along the view line VIII—VIII of FIG. 9 looking in the direction of the arrows.
Figure 9:
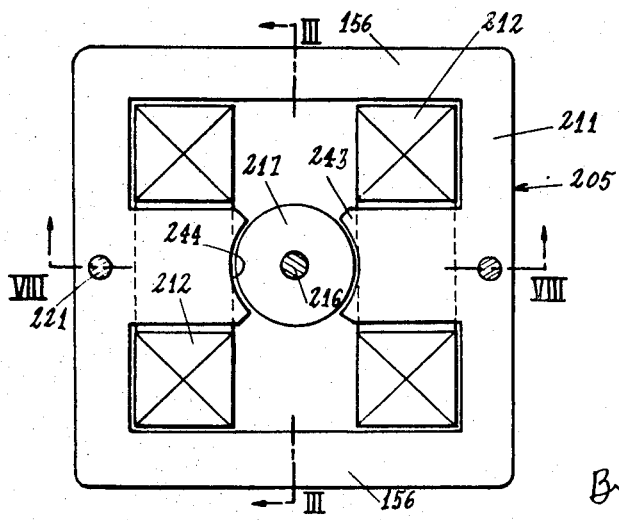
FIG. 9 is a horizontal section taken along the view line IX—IX of FIG. 8.
Figure 13:
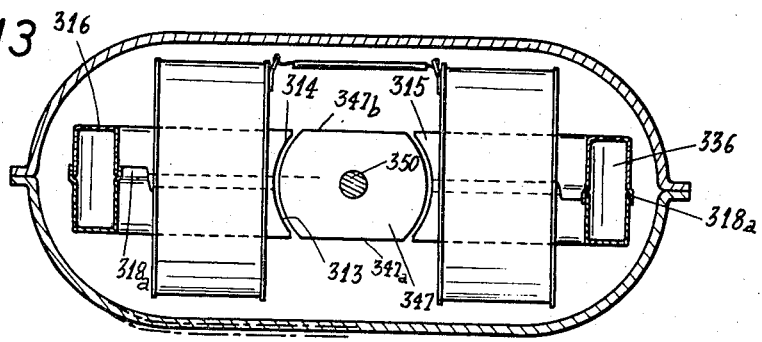
FIGS. 13 and 14 are end views respectively along the view lines XIII—XIII and XIV—XIV of FIG. 12.

The embodiment of the invention shown in FIGS. 8 and 9 is a low pressure electrocompressor which comprises a cast iron cylinder 201 equipped with cooling fins 241 attached to which a cylinder head 203 is fixed to a flange 153, forming an enlargement of the cylinder 201, by screws 242 arranged around the circumference of a circle. The cylinder head 203 has an intake orifice 154 and a delivery orifice 155. An annular intake valve 206 is mounted between the cylinder head 203 and the enlarged part of the cylinder 153 and an output valve 207 is held lightly on its seat by a spring 208 disposed around a plug 209 screwed into the cylinder head 203.

At the opposite end of the cylinder head 203 the cylinder 201 is surrounded by a casing 246. The fixed magnetic circuit 205 is held between the rim of the casing 246 and the rim of a second casing 220, symmetrical with the first, by studs 221 parallel with the axis X-X of the cylinder 201, which thus also pass through the magnetic circuit 205. The two casings 220 and 246 have ports 202 communicating with the exterior for the circulation of cooling air for the motor parts.

The magnetic circuit 205 is stamped from sheet material, stacked and stuck together to form two pole pieces 243, the one facing the other, whose pole surfaces 244 each have a straight cylinder section coaxial with cylinder 201. The pole pieces 243 are connected by yokes 156 of square or rectangular contour corresponding to the casings 220 and 246.

The magnetic circuit 205 is arranged to have a reluctance that decreases from the entrance side of the air gap between the poles surfaces 244. This is achieved by forming the magnetic circuit 205 from a stack of sheets having increasing permeability, for example, successive sheets of silicon iron 204a nearest the cylinder 201, and then sheets 204b of grain orientated material having the grain parallel to the axis of the pole pieces 243. The sheets of silicon iron 204a are preferably of an appreciable thickness (at least twice that of the other sheets 204b) so as to offer sufficient resistance to the forces of attraction of the moving armature, and to reduce the number of air gaps between the sheets, which facilitates deviation of the flux towards the moving armature. On each pole piece 243 is wound an induction coil 212.

The moving assembly A (FIG. 8) comprises a sliding cylindrical piston 213 formed of nonmagnetic stainless material and equipped with self-lubricating rings 251 (superpolyamide or polytetrafluorethylene). Immediately juxtaposed to the piston is a coaxial magnetic armature 215, an axial bolt 216, whose head seats against the nonmagnetic washer 217, holding those parts together. The armature 215 is formed by a cylindrical stack of magnetic sheets having a diameter slightly less than that of the piston 213. These parts are readily machined with high precision.

The moving assembly A is subjected to the action of an axial spring 218 having variable stiffness, whose end coils seat respectively on the washer 217 and on the bottom 157 of the casing 220. The attachment of these end coils is ensured respectively by a retaining washer 214 through which the bolt 216 passes and by a second washer 219 fixed to the bottom 157 of the casing 220 by a screw 158.

The characteristics of the spring 218 are such that it has appreciable stiffness, the force exerted on the moving assembly in the extended position being less than 10 percent of the opposing force in the compressed position. The spring 218 acts in compression over part of the stroke and exerts an opposing force, in extension, when the armature 215 has moved out of the air gap towards the top dead point of operation. To provide variable stiffness, the spring 218 is formed with a variable coil pitch, the smallest pitch being towards the fixed end of the spring, that is, the end at the bottom 157. This arrangement provides the spring 218 with low stiffness at the beginning of the stroke of the assembly A toward the air gap, a greater stiffness at the end of the stroke, and a variable natural frequency.

In its rest position the armature 215 is partially entered in the air gap (distance $d_3$ in FIG. 4) and the magnetic force on the moving assembly A is sufficiently high to ensure starting but the energy transferred to the assembly is sufficiently low to prevent a mechanical shock at the end of the return stroke.

The compact structure of the moving assembly A, guided as an assembly by piston 213, ensures especially precise movement of the armature 215 without risk of contact with the pole surfaces 244. Furthermore, during the last part of the return stroke, spring 218 is in extension, thus providing a force tending to return the assembly A towards the zero force position, for which the armature 215 is partially entered between the poles 243.

The armature 215 is completely out of the air gap at the top dead point of operation, which corresponds to the beginning of the magnetomotive stroke (distance $d_2$ of FIG. 3 between the adjacent face of the armature 215 nearest the pole pieces 243 and the entrance to the air gap). The initial flux is thus low and varies slowly at the beginning of the stroke, the force exerted on the moving assembly is thus relatively small, the speed of the moving assembly only increases slowly, the reluctance of the magnetic circuit remains high and the current rises sharply, resulting in an appreciable force as soon as the armature 215 approaches the first lamination 204a of the circuit 205, which improves the transformation of the electromagnetic energy into mechanical energy.

When the armature 215 has just entered the air gap, the flux which passes through the armature is still limited because of the relatively low permeability of the sheets 204a. When the high permeability sheets 204b commence to coincide with those of the armature 215, the force then increases appreciably.

The special form of the spring 218, which confers on it a variable stiffness, low at the beginning of the power stroke and stronger at the end, and a variable natural frequency, permits the top dead point of operation of the moving assembly to be better controlled and avoids resonant vibrations of the spring.

The cooling of the electric part takes place naturally by the air, displaced on each stroke by the moving assembly, which enters and leaves through the ports 202.

Another advantage of the structure described is the rigid location of the pole pieces 243 relative to the casings 220 and 246 due to the studs 221.

Referring next to the embodiment shown in FIG. 10, a high pressure electrocompressor in which parts similar to those found in the embodiment of FIGS. 8 and 9 are designated with the same reference numbers for greater clarity, the intake orifice 155 receives air via a manifold 158 while the delivery orifice 159 is provided in a threaded plug 161 of a cylinder head 162. The plug 161 is itself restricted by a screw 163 having an axial passage 164 which ends in the delivery pipe 165 for the compressed gas.

A monobloc piston 166 made, for example, of cast iron, slides in the cylinder 201 with clearance between 2 and 35 microns. The length of the piston 166 is greater than twice its diameter. Lubrication of piston 166 is effected by an annular piece 167 of fibrous material, similar to a wick, which dips into an oil chamber 168.

The embodiment of FIG. 2 is arranged to take account of the important influence of friction between the piston and the cylinder on the overall efficiency, which results from the fact that the efficiency of electromechanical transfer depends to a substantial extent on the phase relationship between the movement of the moving assembly A and the electric impulses. The relatively long bearing surface on the piston 166 and the small clearance between the piston and cylinder 201 prevents eccentricity of the magnetic armature 169 between the pole pieces 243 and, consequently, the effects of lateral attraction between the armature 169 and the poles 243 is much reduced, as is friction. This arrangement also reduces leakage between the piston and cylinder to acceptable values, and the overall efficiency of the machine is very high.

The armature 169 is formed by a stack of annular laminations held in place by the bolt 216 whose head passes through and retains the bottom of a hollow nonmagnetic cylinder 289. The diameter of the armature 169 is in this case greater than that of the piston 166 and this armature has, on a side facing the entrance to the air gap, several washers 171, thicker and cut from a less permeable material than the other magnetic washers, so as to provoke a sharp increase in current at the top dead point of operation, as has been explained above.

The elastic system B which is associated with the moving assembly A (FIG. 10) comprises two springs, a main return spring 287 and an opposing spring 290. The spring 287, made of special steel, bears on the bottom 171 of the external casing 220, and on a shoulder 172 of the sleeve 289. The length of the sleeve 289 is such that the plane on which spring 287 acts is, for all positions of the moving assembly A, outside the air gap (as shown in the FIG.) or even outside a volume bounded by the electrical coils. The auxiliary opposing spring 290, housed within the sleeve 289, exerts an opposing force by bearing on an interrupted ring 174 mounted in the sleeve 289 and on a shoulder 173 of an axial part 291 attached to the bottom 171 of casing 220 and partially entering the sleeve 289.

The use of opposing springs 287 and 290 allows the curve of resisting force to vary with the pump stroke such that the return force in the extended position is less than 10 percent of the maximum force exerted on the moving assembly A at the other end of the stroke. It is also possible to use an assembly of main spring 287 and opposing spring 290 having an even greater stiffness. If the spring 287 also works in extension, springs 287 and 290 exert at the beginning of the magnetomotive stroke a force which adds to the magnetomotive force. Any increase in stroke thus results in an appreciable increase of return energy. If the characteristics of the machine are chosen to be optimum for a high delivery pressure, the stroke increases with increase of delivery pressure, the return energy is thus automatically adapted to the increase in delivery pressure and the top dead point of operation remains in a practically constant position whatever the delivery pressure. The above arrangements thus allow any mechanical contact between the moving assembly and the cylinder head 162 to be avoided under all circumstances.

In this embodiment the electrocompressor is suspended by means of two parallel flexible blades 280a and 280b attached respectively to the bottom 171 and to the cylinder head 162. The two blades 280a and 280b are carried by a base plate 296 which may advantageously be formed by a wall of a compressed air reservoir, supplied by the pipe 165, or by the main frame of a machine using the compressed air. The blades exert a substantially null force along the axis of movement and thus suppress the transmission of vibrations to the base plate 296. A stop 297 limits the oscillations and the risks of failure of the blades 290 during transport of the electrocompressor by a carrying handle 298.

In the embodiment of FIG. 10, and also in the preceding embodiment of FIGS. 8 and 9, the magnetic circuit 205 can be made from grain orientated sheet, stamped out and stacked, with the direction of orientation of the grain corresponding preferably to the axis of the pole pieces 243, which makes it possible to have maximum permeability and flux density in the pole pieces.

Such sheets have a higher saturation flux density and permeability which provide a greater maximum flux for a minimum of ampere-turns and thus a reduction of the dimensions of the magnetic circuit and of the coils 212. Hence a higher power to weight ratio is achieved. Preferably the transverse branches 211 (shown in FIG. 9 but not in FIG. 10) of the magnetic circuit 205, which are located perpendicular to the direction of lamination and thus of orientation of the grain, and consequently have inferior magnetic properties have a width at least 30 percent greater than that of the longitudinal branches 156 (shown in FIG. 9 but not in FIG. 10), whose width is half that of the pole pieces 243.

FIGS. 11 to 17 show an improved electrocompressor in accordance with the invention that pumps dangerous or costly gas in a closed circuit with great reliability. The compressor comprises a sealed hermetic casing 300 formed by two symmetrical half casings 301a and 301b in pressed, electrically welded sheet. The casing 300 houses an electromagnetic motor 302 and a pump 303 which are associated by a common moving assembly 304.

The assembly formed by the elements 302, 303 is suspended (FIG. 17) by four elongated rings 355 symmetrically disposed with respect to the axis x-x of the moving assembly 304 and orthogonal with this axis. The rounded upper parts of the rings 355 pass through the rounded feet 308 fixed to the upper half casing 301a. Similarly, the lower parts of the rings 355 are engaged in other feet 356 forming part of the body 302, 303 as will be seen later. This mounting allows the rings 355 to pivot around axes perpendicular to the axis x–x and consequently provide for the body of the machine a certain degree of freedom of movement parallel to the axis x–x.

The half casings 301a and 301b carry stepped stops 307a and 307b intended to limit the movement of the assembly 302, 303 during transport. The half casing 301b is filled with lubricating oil up to a predetermined level N–N, to ensure lubrication of the pump 303 and partial cooling of the assembly, in conformity with the disclosure of copending U.S. Pat. application Ser. No. 788,595, filed by the applicant on Jan. 2, 1969, for "Reciprocating Machine with Fluid Circulation," and now U.S. Pat. No. 3,461,806.

The pump 303 comprises a cylinder 325 of cast iron at the extremity of which are mounted in sequence (FIG. 15) a valve plate 326 with the suction valve 327 and the delivery valve 328, a cylinder head 329, and between them gaskets 330 and 331. The assembly is held together by a collar 332 engaging a shoulder 333 on one side of the cylinder 325 and the outer face of the cylinder head 329 on the other side.

The electromagnetic motor comprises essentially a magnetic circuit 311 in the form of a C whose plane of symmetry passes through the axis of the body formed by the cylinder 325 and whose pole pieces are mechanically attached to this cylinder, as will be seen below. The magnetic circuit 311 consists of grain orientated magnetic laminations with the grain in the longitudinal direction, and it is formed by successive layers of a conducting ribbon rolled on itself, such that each layer is attached to the next inner layer, about an axis perpendicular to the plane of symmetry of the C. The pole pieces 312 are separated by a cylindrical air gap 313 (FIG. 13) defined by the poles 314 and 315. The return branch 311a of the circuit 311 is situated on the opposite side of the entrance to the air gap for the armature 347 which reduces the initial flux due to the longer magnetic path along the outside of the circuit.

On the two poles 312 of the magnetic circuit 311, which are orthogonal to the axis x–x, are mounted coils 320 housed in the spools 321 and having terminal tabs 322 to which may be soldered the ends of the feed wires that lead to a connecter 309 in the wall of the half casing 301a. Within the connecter 309 is advantageously located a semiconductor diode, not shown, to provide for rectification of alternate alternations of the supply voltage.

The magnetic circuit 311 is enclosed in two shells 316, made from pressed sheet, which are assembled and closed in a press. Along their length the shells 316 are separated by a gap 317 (FIGS. 11 and 16) to avoid the circulation of short circuit currents. On the opposite side of the circuit 311 each shell 316 carries two other closed branches 318 such that they present in profile the form of the FIG. 8. The edges of each branch 318 situated on one side of the axis x–x are opened out as shown in 318a (FIGS. 13 and 14) so that during assembly they may be socketed on to the straight edge of the opposite shell 316 as a lid is pressed on to a box. The two branches 318 when pressed together may then be welded or joined by adhesive along their superimposed edges, thus forming two hollow symmetrical chambers 336 symmetrical relative to the axis x–x.

At their intersection with the cylinder 325, the branches 318 are formed with an enveloping profile 318b such that the chambers 336 can communicate with each other by an annular volume 341 between the surfaces 318b of the shells 316 and a sleeve 335 surrounding the cylinder 325 and welded to it.

The two chambers 336 form an intake silencer of appreciable volume which communicates on the one hand with the interior of the casing 300 by an intake nozzle 342 (FIG. 14) and, on the other hand, with a bent suction pipe 340. This latter is attached to one of the chambers 336 at one end and leads to the intake chamber 451 located in the cylinder head 329.

From the compression chamber 452 of the cylinder head 329 leads the delivery pipe 343 which ends at a delivery silencer 344 connected by a footing 345 to one of the shells 316. From the silencer 344 leads a connection 453 which passes through the casing 300 and serves the output circuit 299 shown schematically in FIG. 14. This latter returns to the interior of the casing 300 by the nozzle 454.

The moving assembly 304 of the compressor, whose power stroke takes place on the opposite side to the return branch 311a of the magnetic circuit 311, comprises a piston 346 of cast iron, without piston rings, a movable cylindrical armature 347 (FIG. 12) formed by a stack of grain orientated magnetic laminations with the grain parallel to the pole branches 312, which increases the maximum flux.

The armature 347 has two flats 347a and 347b (FIG. 13) whose distance apart is at most equal to the width of the pole branches. This arrangement provides a magnetic restoring torque which ensures the correct angular orientation of the armature 347 which is free to rotate. With this orientation, the value of the initial flux is a minimum when the armature is on the point of entering the air gap. On the side opposite the piston 346, the armature 347 carries a nonmagnetic mass 348 which has a shoulder 455 ensuring the centering of the main spring 349, parts 346, 347 and 348 being held together by an axial bolt 350. The main spring 349, formed of nonmagnetic material, is also centered by a washer 351 of pressed sheet, which is attached by the feet 351a to the part of the shells 316 which surround the return branch 311a of the circuit 311, thus avoiding the need to specify a special part for this purpose. An auxiliary opposing spring 352 is mounted between the armature 347 and the shoulder of the cylinder 325 which carries the sleeve 335.

Figure 14:
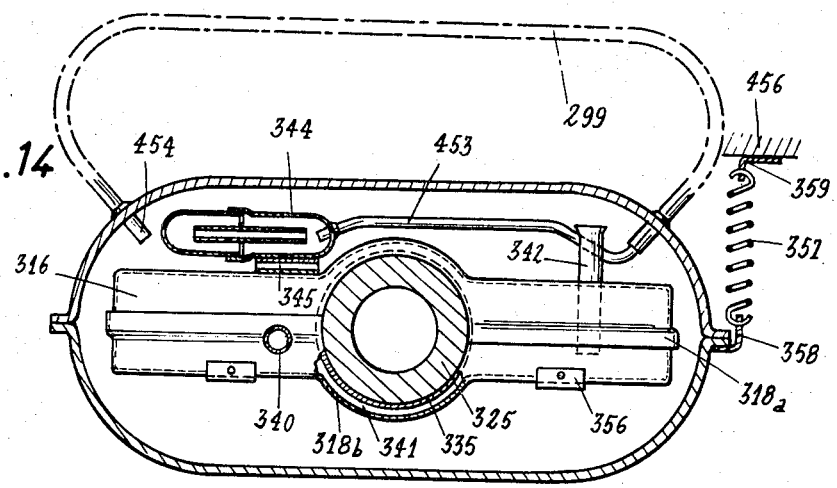

During operation the casing 300 is preferably suspended by means of the springs 357, and the feet 358 and 359, to a fixed support 456 (FIG. 14). Thus, with the rings 355, a two-stage suspension is provided that damps out vibration and noise.

The high pressure electrocompressor shown in FIGS. 18 to 20 constitutes a modification of the embodiment shown in FIGS. 11 to 17. This electrocompressor is of the type which is generally flat and has a high compression ratio. It is intended for high quantity production, and its special feature include the magnetic circuit and the arrangement of the return springs. A body 370, in which is bored a cylinder 378, is made of magnetic material and thus forms a part of the magnetic circuit by playing the role of a magnetic yoke. The body 370 comprises, on each side of the hollow spaces 379, two wings 371a, 371b supporting a magnetic circuit 372 by means of two through-bolts 373. The magnetic circuit 372 is formed by a stack of magnetic laminations cut out in a C profile, the plane of the laminations being parallel to the plane of mechanical symmetry of the compressor, which facilitates the distribution of the flux in the pole branches when the armature is only slightly engaged in the air gap. Pole pieces 461 carry electrical coils 374 which have a radial thickness e smaller than their axial length L and are made from alternate layers of conducting ribbon and insulation. Thus the coils use little lateral space, are relatively inexpensive, will withstand mechanical vibrations well, and possess an excellent coefficient of thermal exchange. In a variant of the high unit power, the conductor ribbon may be formed of anodized aluminum.

The moving assembly comprises a magnetic laminated armature 376 fixed by means of a bolt 462 to a piston 377 which slides in the cylinder 378. The elastic system associated with the moving assembly comprises a main return spring 478 and an opposing auxiliary spring 380, both of magnetic material, coaxial to the axis x–x of movement of the assembly and housed in empty spaces 379 around the cylinder 378.

The spring 478 (FIG. 20) is mounted between an annular washer 381 disposed around the central orifice 463 of the body 370 and the curved extremity of the stepped sleeve 382 held between the armature 376 and the piston 377, and which surrounds the body of the cylinder 378. The return spring 380 is mounted between a shoulder of the body and another shoulder of the sleeve 382. Depending on the characteristics of the closed output circuit, it may be preferable to operate without the auxiliary spring 380.

Due to the position adopted for the springs 478, 380, the magnetic elements other than the circuit 372 and the armature 378 are kept away from the air gap and the space separating the coils 374. This reduces the parasitic influence of these elements on the electromagnetic motor. Further, the mechanical parts are grouped in a single compact unit independent in all respects from the electromagnetic part.

The whole of the device thus constituted is located in a sealed casing 446 formed of two shells welded together and into which the feed pipe 467 enters. Intake into the casing 466 is achieved by a nozzle 475 connected to a chamber 476 which communicates by a conduit 477 with the cylinder head 468 of the body 370. To this is connected an exhaust pipe 469 which leads to a silencer 470 from which leaves a pipe 471 for delivery of the compressed gas or air.

The electrocompressor unit is suspended relative to the casing 466 by three springs 472, two of which are mounted in bores 473 of the body 370, the third being mounted on a foot 474 of the yoke 372a of the magnetic circuit 372. The casing 466 may itself be mounted on a support, preferably vertical, by means of feet 481 fitted with flexible shoes 482.

Figure 21:
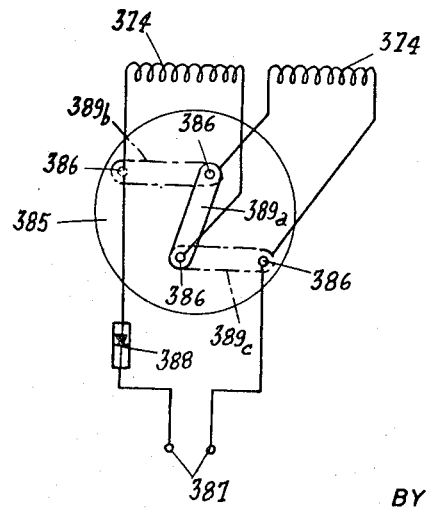
FIG. 21 is a circuit diagram showing an exemplary power supply arrangement for the electrical windings.

The coils 374 are supplied by means of a terminal plate 385 (FIGS. 18 and 21). The coils 374 are each connected to two pairs of terminals 386 on the plate 385. Two of these terminals are permanently connected to the terminals of an alternating current supply 387 across a rectifier 388. The other two terminals can be connected in series by a bus bar 389a which corresponds to a series supply of the coils 374. Alternatively two bus bars 389b and 389c can be used, as shown, for the supply to the coils 374 in parallel. This allows the electrocompressor to be switched for use on supply systems having two different voltages, one approximately double the other. In both cases the coils 374 are connected so that the magnetic fluxes are added to each other.

The embodiment shown in FIGS. 22 and 23 is a low pressure electrocompressor which comprises a cylinder 401 equipped with a cylinder head 402 similar to that shown in FIG. 8. The suction system 403 is equipped with an air filter 404 having a filter element 405. On the other side the cylinder 401 has an enlarged section forming a casing 406 to which is attached a stack of laminations of the fixed magnetic circuit 407, to whose other face is attached a second casing 408. The casings 406 and 408 are pressed against the magnetic circuit 407 by bolts 409. The pole pieces 411 of the circuit 407 are each surrounded by a coil 412.

A compressor piston 413 housed in the cylinder 401 carries an annular laminated magnetic armature 414, adjacent to one side of the circuit 407 and fixed by an attachment sleeve 415. The piston forms the casing in which the springs act.

On the axis of the compressor is arranged a rod 416 which penetrates into the hollow piston 413 through the sleeve 415 and which is fixed on the casing 408. A head 417 of the rod 416 takes the thrust of a return spring 418 and of an opposing spring 419, both of which are located within the hollow piston 413. The compressor, as before, is mounted so that it oscillates between flexible arms 421 carried by mounting shoes 422. A carrying handle 423 is provided. The lubrication of the piston 413 is ensured by splashing of lubricant from a reservoir 424 which communicates with cylinder 401 by means of an opening 425.

It is evident that the invention is not limited to the examples described above and that variations of manufacture may be made in accordance with the invention. Thus it follows that certain of the means described in connection with one embodiment may be applied to other modifications without going beyond the scope of the invention.

I claim:

1. A reciprocating machine comprising a housing having a reciprocating element adapted to be driven therein; an electric motor for driving the element and having a fixed magnetic circuit with a pair of spaced-apart magnetic poles with surfaces defining an air gap having an entrance and a selected axial length, and at least one field coil adapted to generate a magnetic field across the air gap, a magnetic armature having an adjacent end face and mounted for reciprocating movement along an axis disposed transversely to the magnetic field across the air gap and coupled to the reciprocating element to form an assembly moving through a stroke in the machine; means for supplying a succession of unidirectional electric current pulses to the field generating coil each of which pulses generates a magnetic field to drive the armature in one direction into the air gap to a bottom dead point of operation, the current supply means initiating each current pulse when a voltage of given polarity is impressed across the field coil and preventing the current from reversing direction in the field coil, and the current pulse supply means controlling the interruption of each pulse when the current in the coil becomes substantially zero and maintaining the interruption until the supply voltage is of the said given polarity; and elastic means distinct from the electromagnetic circuit for driving the armature in the other direction, said elastic means being operative to drive the armature to a top dead point of operation at which the armature is entirely out of the air gap such that the adjacent end face of the armature is spaced from the entrance to the air gap at its top dead point of operation a maximum distance of substantially 20 percent of the axial length of the air gap, thereby to cause a high reluctance in the magnetic circuit and a resulting sharp increase in current in the field coil when said voltage of give polarity is impressed across the field coil.

2. A machine as defined in claim 1, and further comprising mechanical stop means for limiting the movement of the armature in the direction towards the top dead point of operation and providing a mechanical top dead point wherein the armature is entirely out of the air gap and the adjacent end face of the armature is spaced from the entrance to the air gap a distance greater than when the moving assembly is at its top dead point of operation.

3. A machine as defined in claim 1, wherein the moving assembly has a zero force position with the armature partially in the air gap.

4. A machine as defined in claim 3, wherein the adjacent end face of the armature is spaced from the entrance to the air gap a distance substantially between 2 and 20 percent of the axial length of the air gap when the moving assembly is in its zero force position.

5. A machine as defined in claim 1, wherein the current supply means functions to provide substantially half wave sinusoidal current pulses, the elastic means and the current supply means being selected so that each current pulse is initiated in the field coil before the moving assembly reaches its top dead point of operation and each current pulse is terminated in the field coil when the moving assembly is close to its bottom dead point of operation.

6. A machine as defined in claim 1, wherein the elastic means has a variable rate of variation of force with displacement, the said rate being least when the moving assembly is near or at its top dead point of operation.

7. A machine as defined in claim 1, wherein the l elastic means exerts a force on the moving assembly near or at its top dead point of operation that is not more than 10 percent of the maximum force it exerts on the moving assembly at the other end of its stroke.

8. A machine as defined in claim 1, wherein the magnetic poles and/or the armature are formed by a stack of laminations orthogonal to the axis of movement of the moving assembly, and at least the first of the laminations at the entrance to the air gap and/or at least the first of the laminations at the entrance to the air gap and/or at least the first of the laminations on the adjacent end of the armature having a lesser permeability than that of the adjacent laminations to provide an increasing magnetic permeability for the magnetic circuit as the armature enters and travels into the air gap.

9. A machine as defined in claim 1, in which the magnetic poles and/or the magnetic armature are formed by a stack of laminations orthogonal to the axis of movement of the moving assembly, and at least the first of the laminations at the entrance to the air gap and/or at least the first of the laminations on the adjacent end of the armature have a greater thickness than that of the adjacent laminations.

10. A machine as defined in claim 1, wherein the housing includes a cylinder, and reciprocating element is a piston whose length is greater than twice its diameter, the piston sliding in the cylinder with a clearance substantially between 5 and 35 microns.

11. A machine as defined in claim 1, in which the armature and air gap formed by the poles are cylindrical in form, such cylinder having a diameter greater than the axial length of the pole surfaces.

12. A machine as defined in claim 1, wherein the elastic means comprises at least one spring, the moving assembly includes a hollow sleeve having at least one thrust collar mounting the spring, and the plane of thrust of the spring on the collar of the hollow sleeve is external to the air gap in all positions of the moving assembly.

13. A machine as defined in claim 1, wherein the elastic means comprises at least one spring, and the moving assembly includes a hollow sleeve through which a fixed axial rod is inserted, and means for connecting the spring to the rod and to the assembly.

14. A machine as defined in claim 1, wherein the housing includes a cylinder and the reciprocating element comprises a piston sliding in the cylinder, and the cylinder is made of magnetic material which forms a part of the magnetic circuit.

15. A machine as defined in claim 1, in which the magnetic armature is free to rotate about its axis, the armature being formed with two opposite flat surfaces joined by sections of cylindrical surfaces, the distance between the flat surfaces corresponding to the width of the poles of the fixed magnetic circuit.

16. A machine as defined in claim 1, in which the magnetic circuit is in the form of a C, the plane of symmetry of the circuit passing through the axis of the housing and having the poles mechanically joined to the housing, the entrance to the air gap into which the armature moves being on the opposite side of the return circuit of the magnetic circuit.

17. A machine as defined in claim 16, in which the return circuit of the magnetic circuit is joined to the elastic means.

18. A machine as defined in claim 1 wherein the elastic means exert a force on the armature which is nil at a position of the moving assembly in which the armature is partially in the air gap and in which the adjacent face of the armature is spaced from the entrance to the air gap a maximum distance substantially equal to 20 percent of the axial length of the air gap.

19. A machine as defined in claim 18, wherein the elastic means comprises a spring that acts in compression over part of the stroke of the moving assembly and in tension when the armature is substantially out of the air gap.

20. A machine as defined in claim 18, wherein the elastic means comprises a main return spring tending to move the armature out of the air gap and an auxiliary opposing spring tending to move the armature into the air gap.

21. A reciprocating machine comprising a housing having a reciprocating element adapted to be driven therein; an electric motor for driving the element and having a fixed magnetic circuit with a pair of spaced-apart magnetic poles with surfaces defining an air gap having an entrance and a selected axial length, and at least one field coil adapted to generate a magnetic field across the air gap, a magnetic armature having an adjacent end face and mounted for reciprocating movement along an axis disposed transversely to the magnetic field across the air gap and coupled to the reciprocating element to form an assembly moving through a stroke in the machine; and means for supplying a succession of unidirectional electric current pulses to the field generating coil each of which generates a magnetic field to drive the armature in one direction into the air gap to a bottom dead point of operation, the current supply means initiating each current pulse when a voltage of given polarity is impressed across the field coil and preventing the current from reversing direction in the field coil, and the current pulse supply means controlling the interruption of each pulse when the current in the coil becomes substantially zero and maintaining the interruption until the supply voltage is of the said given polarity; and elastic means distinct from the electromagnetic circuit for driving the armature in the other direction, said elastic means having a variable rate of variation of force with displacement, said rate being least when the moving assembly is near or at its top dead point of operation.

22. A machine as defined in claim 21, wherein the elastic means exerts a force on the moving assembly near or at its top dead point of operation that is not more than 10 percent of the maximum force it exerts on the moving assembly at the other end of its stroke.

23. A machine as defined in claim 21, wherein the elastic means comprises a spring that acts in compression over part of the stroke of the moving assembly and in tension when the armature is substantially out of the air gap.

24. A machine as defined in claim 21, wherein the elastic means comprises a spring of variable stiffness that exerts a force on the moving assembly near or at its top dead point of operation that is not more than 10 percent of the maximum force it exerts on the moving assembly at the other end of its stroke.

PO-1050
(5/69)

UNITED STATES PATENT OFFICE
CERTIFICATE OF CORRECTION

Patent No. 3,542,495          Dated November 24, 1970

Inventor(s) Maurice Barthalon

It is certified that error appears in the above-identified patent and that said Letters Patent are hereby corrected as shown below:

Column 10, line 39, "feature" should be --features-
Column 11, line 9, "446" should be --466--;
Column 12, line 27, "give" should be --given--; lii
"1" second occurrence, should be deleted; line 67,
delete "at the"; line 68, delete whole line; line (
delete "tions"; line 69, "having" should be --have- Signed and sealed this 11th day of May 1971.

(SEAL)
Attest:

EDWARD M.FLETCHER,JR.          WILLIAM E. SCHUYLER, JR.
Attesting Officer          Commissioner of Patents